(12) United States Patent
Beall

(10) Patent No.: US 11,208,181 B1
(45) Date of Patent: Dec. 28, 2021

(54) BOW FISHING ILLUMINATION SYSTEM

(71) Applicant: Christopher J. Beall, Delavan, WI (US)

(72) Inventor: Christopher J. Beall, Delavan, WI (US)

( * ) Notice: Subject to any disclaimer, the term of this patent is extended or adjusted under 35 U.S.C. 154(b) by 222 days.

(21) Appl. No.: 16/561,314

(22) Filed: Sep. 5, 2019

Related U.S. Application Data

(60) Provisional application No. 62/840,596, filed on Apr. 30, 2019.

(51) Int. Cl.
| | | |
|---|---|---|
| *B63B 45/02* | (2006.01) | |
| *F21V 7/05* | (2006.01) | |
| *F21V 7/00* | (2006.01) | |
| *F21Y 115/10* | (2016.01) | |
| *A01K 97/12* | (2006.01) | |
| *B63H 21/21* | (2006.01) | |

(52) U.S. Cl.
CPC ............ *B63B 45/02* (2013.01); *A01K 97/125* (2013.01); *B63H 21/213* (2013.01); *F21V 7/0033* (2013.01); *F21V 7/05* (2013.01); *F21Y 2115/10* (2016.08)

(58) Field of Classification Search
CPC ...... B60Q 1/32; B60Q 1/323; F21W 2107/20; F21S 43/30
See application file for complete search history.

(56) References Cited

U.S. PATENT DOCUMENTS

| | | | | |
|---|---|---|---|---|
| 1,779,180 A | * | 10/1930 | James | ..................... B63B 45/04 362/308 |
| 2,300,067 A | * | 10/1942 | Schwab | .................. B02C 7/184 114/15 |
| 2,499,471 A | | 3/1950 | Dunning | |
| 3,545,398 A | * | 12/1970 | Morrison | ............... B63H 25/42 114/144 R |
| 3,604,384 A | | 9/1971 | Coles | |
| 4,356,786 A | | 11/1982 | Tuggle | |
| 5,082,465 A | | 1/1992 | Wine | |
| 5,090,929 A | | 2/1992 | Rieben | |
| 5,636,916 A | * | 6/1997 | Sokolowski | ............. B60Q 1/26 340/984 |
| 5,730,079 A | * | 3/1998 | Totty | ....................... B63B 45/02 114/343 |
| 6,132,267 A | | 10/2000 | Campbell | |

(Continued)

*Primary Examiner* — Alexander K Garlen
(74) *Attorney, Agent, or Firm* — Salter & Michaelson

(57) ABSTRACT

A bow fishing illumination system for support on a vessel and including a bank of illumination modules that extend outboard of the vessel so as to illuminate a water surface about the vessel. The bank of illumination modules includes a support housing, a reflective member disposed with the support housing and having a reflective surface, and an array of LED's disposed with the support housing in a manner to have their light beam extend away from the support housing. The array of LED's includes a plurality of LED's that are arranged in at least one spaced apart linear array. A joystick controller is mounted on the vessel and includes a base used for the purpose of mounting the joystick controller, a joystick mounted to the base, a first button on the base that is separate from the joystick for controlling a locking feature, and a second button on the base that is separate from the joystick for controlling an auto pilot feature.

15 Claims, 20 Drawing Sheets

(56) References Cited

U.S. PATENT DOCUMENTS

| | | | |
|---|---|---|---|
| 6,146,219 A | 11/2000 | Blanchard | |
| 6,230,642 B1 | 5/2001 | McKenney et al. | |
| 6,231,217 B1* | 5/2001 | Krippelz, Sr. | B60Q 1/32 114/15 |
| 6,234,100 B1 | 5/2001 | Fadeley et al. | |
| 6,308,651 B2 | 10/2001 | McKenney et al. | |
| 6,357,375 B1 | 3/2002 | Ellis | |
| 6,386,930 B2 | 5/2002 | Moffet | |
| 6,401,644 B2 | 6/2002 | Fadeley et al. | |
| 6,447,349 B1 | 9/2002 | Fadeley et al. | |
| 6,453,835 B2 | 9/2002 | Fadeley et al. | |
| 6,474,851 B1* | 11/2002 | Baley | A01K 97/02 362/477 |
| 6,538,217 B1 | 3/2003 | Eriksen et al. | |
| 6,546,890 B1 | 4/2003 | Craig | |
| 6,592,412 B1 | 7/2003 | Geil et al. | |
| 6,604,479 B2 | 8/2003 | McKenney et al. | |
| 6,604,480 B1 | 8/2003 | Sanchez | |
| 6,655,309 B1 | 12/2003 | Stephens | |
| 6,739,280 B2 | 5/2004 | Keller | |
| 6,865,997 B2 | 3/2005 | Stephens | |
| 6,942,531 B1 | 9/2005 | Fell et al. | |
| 6,978,729 B2 | 12/2005 | Bertetti et al. | |
| 7,044,815 B1 | 5/2006 | Symes et al. | |
| 7,121,219 B1 | 10/2006 | Stallings | |
| 7,134,773 B2* | 11/2006 | Tufte | G09F 13/20 362/505 |
| 7,249,568 B1 | 7/2007 | Cultrara | |
| 7,291,852 B1* | 11/2007 | Matlack | A01K 97/00 250/504 R |
| 7,344,344 B2 | 3/2008 | Davis | |
| 7,401,949 B2* | 7/2008 | Tufte | B60Q 1/32 362/369 |
| 7,438,013 B2 | 10/2008 | Mizutani | |
| 7,840,318 B2 | 11/2010 | Bremsjo | |
| 8,464,700 B2 | 6/2013 | Smith et al. | |
| 8,589,004 B1 | 11/2013 | Kanno | |
| 8,672,043 B2 | 3/2014 | Korach et al. | |
| 8,676,412 B2 | 3/2014 | Pereira | |
| 8,695,749 B2 | 4/2014 | Zsido | |
| 8,758,071 B2 | 6/2014 | Ulgen | |
| 8,955,452 B1 | 2/2015 | Wilson | |
| 9,101,119 B2 | 8/2015 | Dunlop et al. | |
| 9,174,704 B1 | 11/2015 | Crawford | |
| 9,233,732 B2 | 1/2016 | Wilson | |
| 9,233,748 B2 | 1/2016 | McIntee | |
| 9,309,730 B2 | 4/2016 | Korach et al. | |
| 9,387,916 B2 | 7/2016 | Skauen | |
| 9,395,145 B2 | 7/2016 | Woods, Jr. | |
| 9,440,724 B2 | 9/2016 | Suzuki et al. | |
| 9,474,258 B2 | 10/2016 | Dunlop et al. | |
| 9,523,556 B2 | 12/2016 | Grace, Jr. et al. | |
| 9,528,796 B2 | 12/2016 | Grace, Jr. et al. | |
| 9,616,971 B2 | 4/2017 | Gai | |
| 9,650,119 B2 | 5/2017 | Moikami et al. | |
| 9,663,211 B2 | 5/2017 | Suzuki et al. | |
| 9,669,915 B1 | 6/2017 | Won et al. | |
| 9,688,374 B2 | 6/2017 | Suzuki et al. | |
| 9,697,738 B2 | 7/2017 | Ausenda | |
| 9,738,366 B2 | 8/2017 | Gai et al. | |
| 9,771,138 B2 | 9/2017 | Ito | |
| 9,772,014 B2 | 9/2017 | Takase | |
| 9,834,418 B2 | 12/2017 | Gerard | |
| 9,840,820 B2* | 12/2017 | Taylor | B63B 45/04 |
| 9,849,936 B2 | 12/2017 | Scanu et al. | |
| 9,862,473 B2 | 1/2018 | Rydberg et al. | |
| 9,904,293 B1 | 2/2018 | Heap et al. | |
| 10,053,200 B1 | 8/2018 | Koetsier et al. | |
| 10,071,793 B2 | 9/2018 | Koyano et al. | |
| 10,094,638 B2 | 10/2018 | Grace, Jr. et al. | |
| 2010/0023192 A1* | 1/2010 | Rae | B63B 79/10 701/21 |
| 2010/0118557 A1* | 5/2010 | Ortwein | B63B 45/00 362/477 |
| 2014/0056013 A1* | 2/2014 | Hancock, Jr. | B63B 59/02 362/477 |
| 2015/0217840 A1* | 8/2015 | Taylor | B63B 45/04 114/219 |
| 2016/0102815 A1* | 4/2016 | Bailey | F21V 21/30 362/477 |
| 2016/0236757 A1* | 8/2016 | Davis | B63H 20/32 |
| 2020/0290710 A1* | 9/2020 | Edwards | F21S 43/14 |

* cited by examiner

BOW FISHING ILLUMINATION SYSTEM

RELATED CASES

Priority for this application is hereby claimed under 35 U.S.C. § 119(e) to commonly owned and U.S. Provisional Patent Application No. 62/840,596 which was filed on Apr. 30, 2019 and which is incorporated by reference herein in its entirety.

FIELD OF THE INVENTION

The present invention relates to an improved bow fishing illumination system for a vessel. This invention also relates to a joystick controller that is adapted to control in an easy manner several functions associated with the vessel.

BACKGROUND OF THE INVENTION

The present invention has come about in order to provide an improvement in both an illumination system for a vessel, that is particularly for bow fishing, and an improvement related to a joystick control of the vessel. For illumination apparatus there presently exist several items, but these existing devices are ineffective. For example, one such company is Outrigger Outdoors of Sealy, Tex. For the most part existing illumination apparatus mostly just use LED flood lights that are designed for outdoor lighting or indoor shop lights that have simply been bolted to a deck of a boat and hooking them up to a generator that is onboard. On the other hand the illumination system of the present invention provides for maximizing efficiency, visibility in various conditions, and for added versatility and control for the bow fisherman. As far as existing joysticks are concerned, although they have been used in a limited way in association with a vessel, any existing systems lack sufficient control and are limited as to their scope of control.

Accordingly, it is an object of the present invention to provide an improved LED illumination system.

Still another object of the present invention is to provide an improved LED illumination system that is particularly adapted for use in a bow fishing environment.

Another object of the present invention is to provide an improved joystick control for controlling several different functions associated with a boat or any water vessel.

SUMMARY OF THE INVENTION

To accomplish the improvements of the present invention there is provided a bow fishing illumination system for support on a vessel and comprised of a bank of illumination modules that extend outboard of the vessel so as to illuminate a water surface about the vessel. The bank of illumination modules includes a support housing, a reflective member disposed with the support housing and having a reflective surface, and an array of LED's disposed with the support housing in a manner to have their light beam extend away from the support housing. The reflective member is supported at the support housing so that the reflective surface is substantially horizontal so as to direct the light beam from the LED array toward the water surface.

In accordance with other aspects of the present invention each of the illumination modules is spaced apart from an adjacent illumination module; the bank of illumination modules includes at least one illumination module directed forward at a front of the boat and at least one illumination module on respective fore and aft sides of the boat; the array of LED's include a plurality of LED's that are arranged in a spaced apart linear array, and the reflective surface is substantially planar; including a planar circuit board to which the spaced apart linear array is secured, the planar reflective surface having an orthogonal relationship to the planar circuit board; the array of LED's is comprised of a pair of spaced apart LED sets, wherein the sets of LED's are disposed in parallel with each other; one LED set is comprised of white wavelength LED's and the other LED set is comprised of amber wavelength LED's; including a switch that enables illumination of either or both of the sets of LED's; and further including a joystick controller for controlling a direction of motion of the vessel, a speed of the vessel, and an auto pilot mode.

In accordance with another aspect of the present invention there is provided a bow fishing illumination system for support on a vessel and comprised of a bank of illumination modules that extend outboard of the vessel so as to illuminate a water surface about the vessel. The bank of illumination modules includes a support housing, a reflective member disposed with the support housing and having a reflective surface, and an array of LED's disposed with the support housing in a manner to have their light beam extend away from the support housing. The array of LED's includes a plurality of LED's that are arranged in at least one spaced apart linear array.

In accordance with other aspects of the present invention the reflective surface is substantially planar; the reflective member is supported at the support housing so that the reflective surface is substantially horizontal so as to direct the light beam from the LED array against the reflective surface and downward toward the water surface; including a planar circuit board to which the spaced apart linear array is secured, the planar reflective surface having an orthogonal relationship to the planar circuit board; the array of LED's is comprised of a pair of spaced apart LED sets, wherein the sets of LED's are disposed in parallel with each other; one LED set is comprised of white wavelength LED's and the other LED set is comprised of amber wavelength LED's; including a switch that enables illumination of either or both of the sets of LED's; and further including a joystick controller for controlling a direction of motion of the vessel, a speed of the vessel, and an auto pilot mode.

In accordance with still another aspect of the present invention there is provided a system for controlling multiple functions used in controlling a vessel and comprised of a joystick controller that is mounted on the vessel and that includes a base used for the purpose of mounting the joystick controller, a joystick mounted to the base, a first button on the base that is separate from the joystick for controlling a locking feature, and a second button on the base that is separate from the joystick for controlling an auto pilot feature.

In accordance with other aspects of the present invention the joystick has a handle that includes a trigger button for controlling a propeller between on and off position in order to control the motion of the vessel, and a speed button that controls a high speed mode of operation of the vessel; and the handle is tilted left for controlling a left turn, is tilted right for controlling a right turn, is tilted forward to increase the speed of the vessel, and is tilted backward to decrease the speed of the vessel.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying figures:

FIG. 12 illustrates the sets of LEDs at B1 and B2 as well as the reflector surface E1;

In FIG. 13 there is also illustrated the drivers at K, a control board at R and a power supply Q;

FIG. 17 also illustrates the potential mounting of the joystick controller at J;

DETAILED DESCRIPTION

Figure 1:
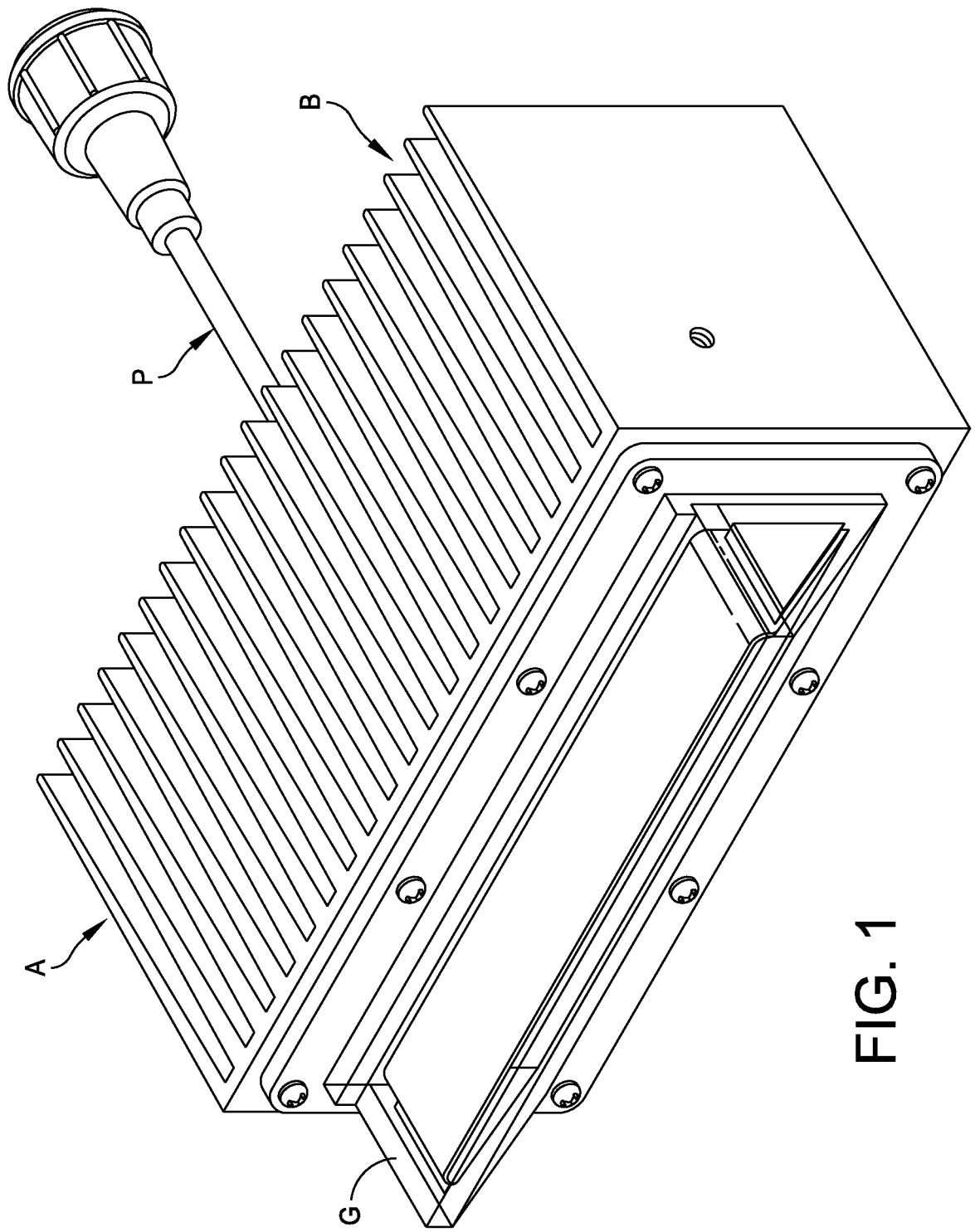
FIG. 1 is a perspective view illustrating one of the modules of a bow fishing illumination system including the heat sink B and the power input indicated at P.
Figure 2:
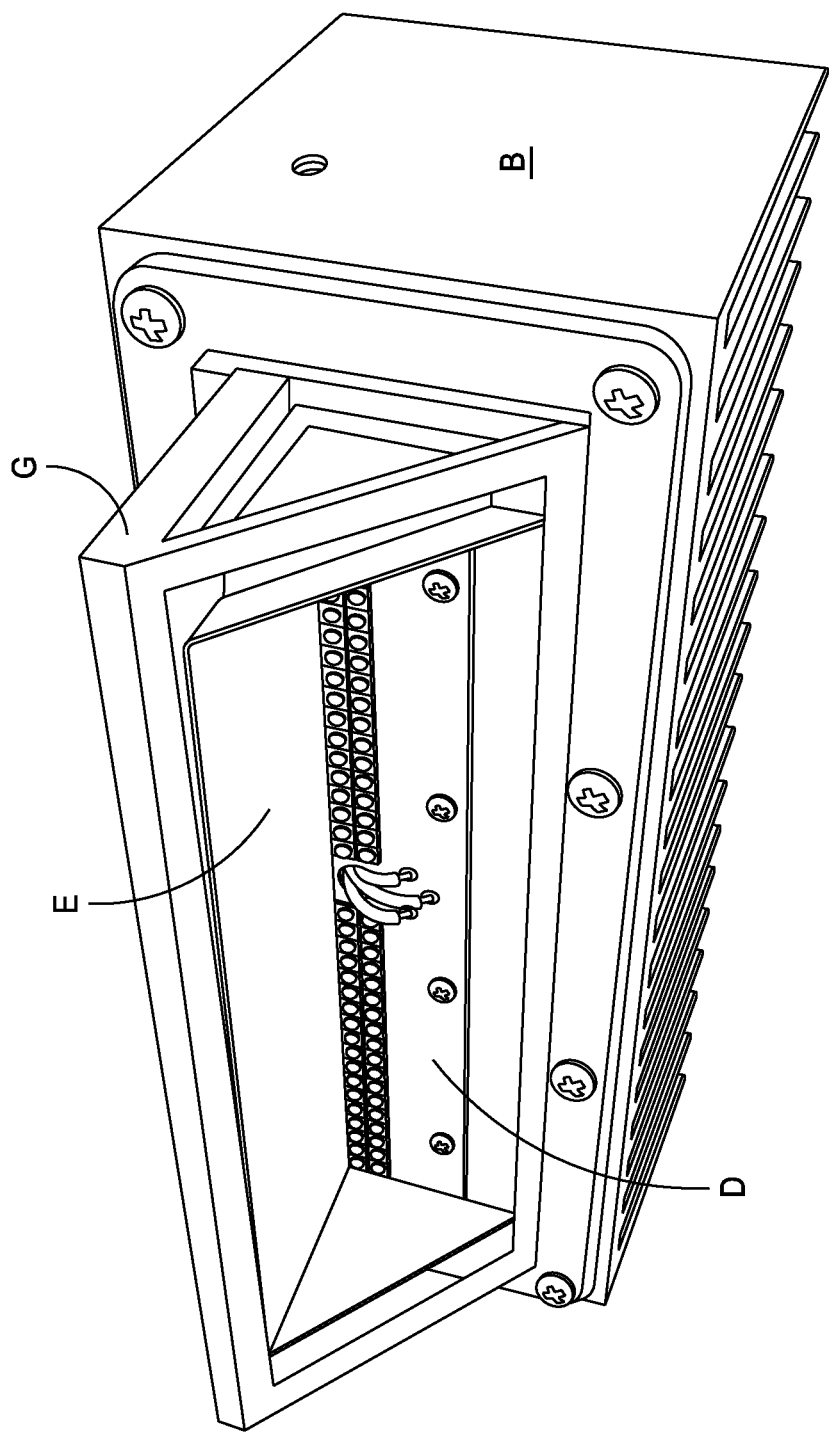
FIG. 2 is a perspective view taken from a lower position of the modular FIG. 1 illustrating the heat sink B, the support housing G, the reflector surface E and the printed circuit board D.
Figure 3:
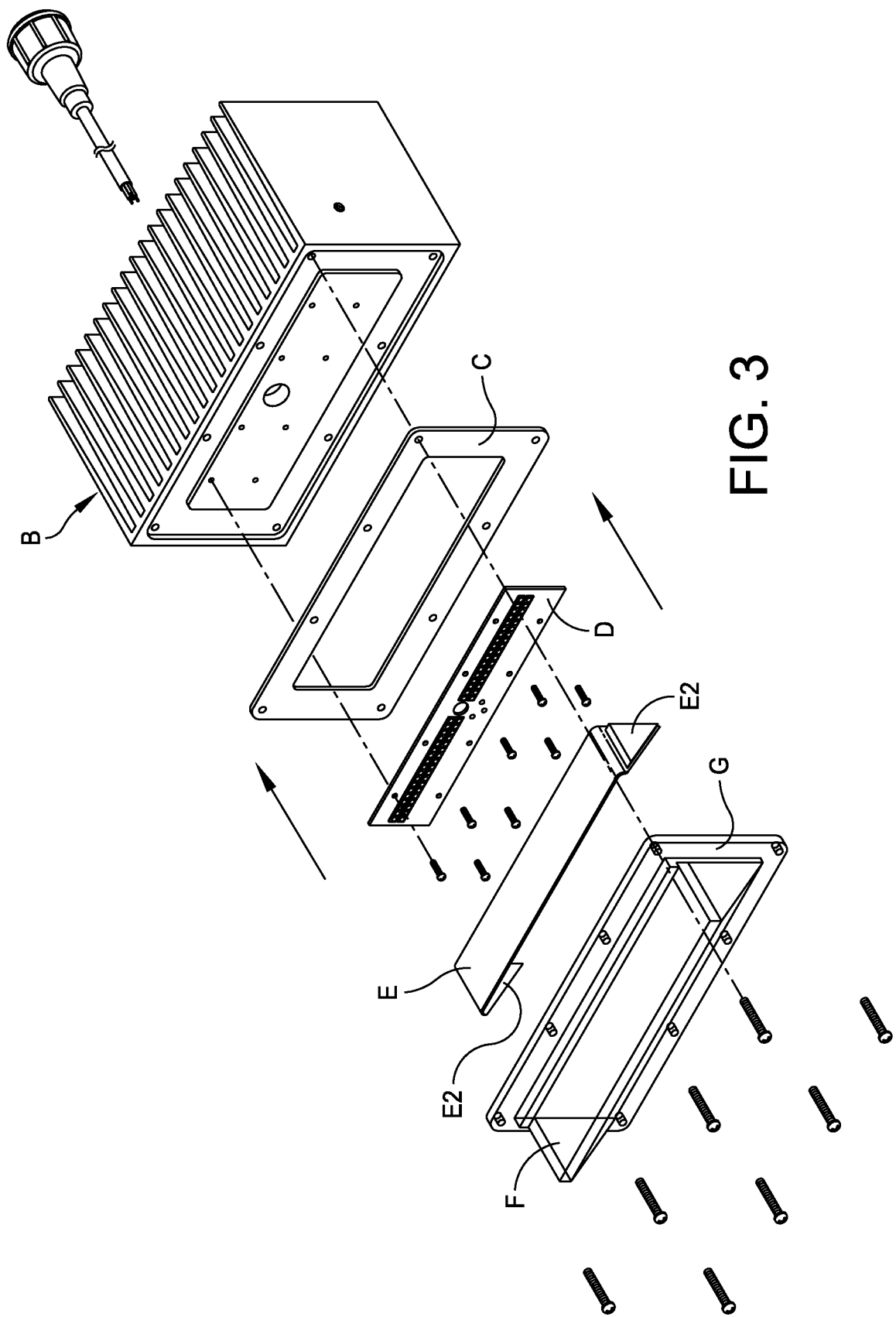
FIG. 3 is an exploded view illustrating the components comprising the module of FIGS. 1 and 2 and including the heat sink B, the gasket C, the printed circuit board D, the reflector member E with triangular sides E2 and the support housing G which includes the translucent plastic piece F.
Figure 4:
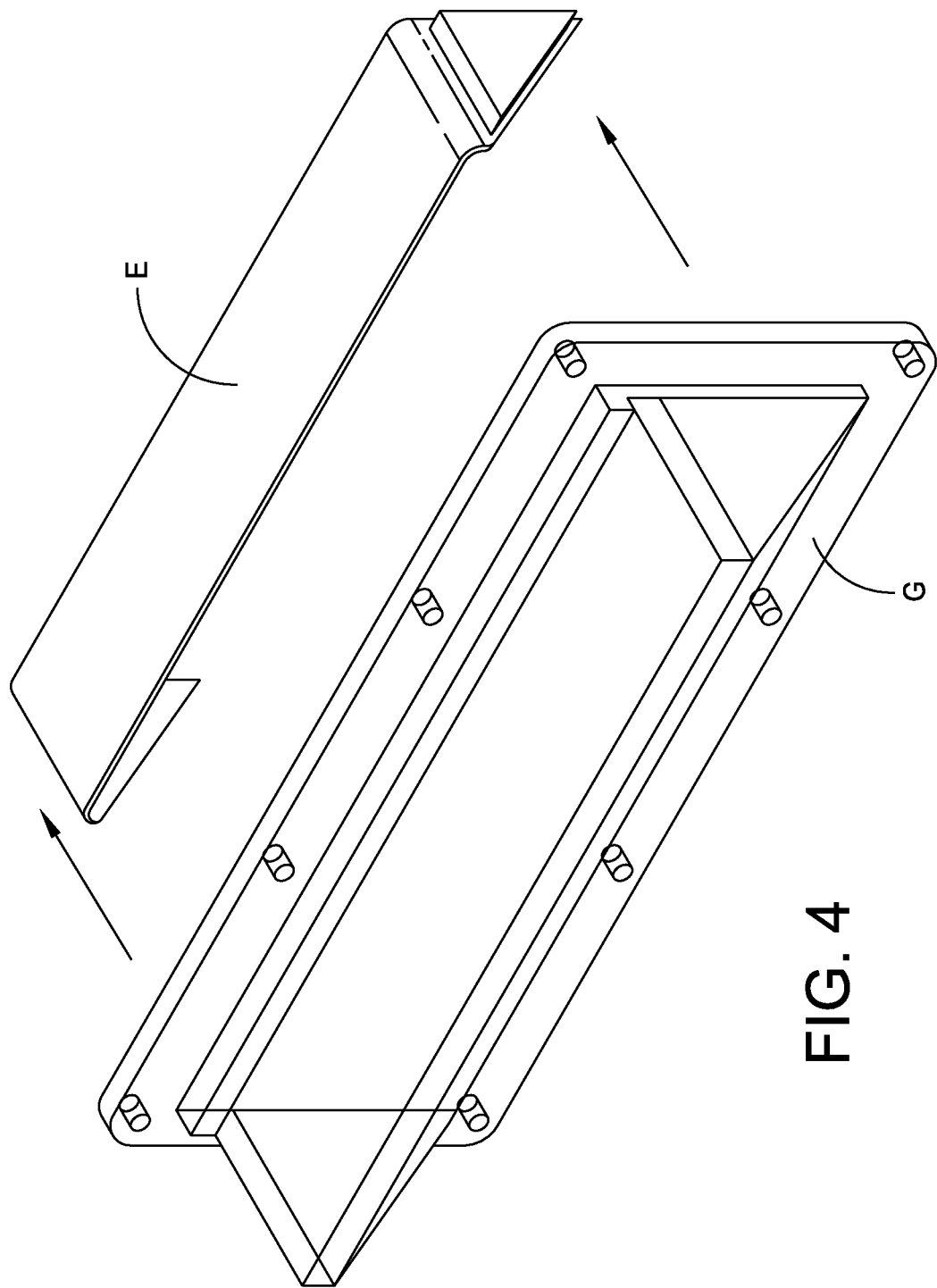
FIG. 4 is an exploded perspective view of the housing G and the reflector E.
Figure 5:
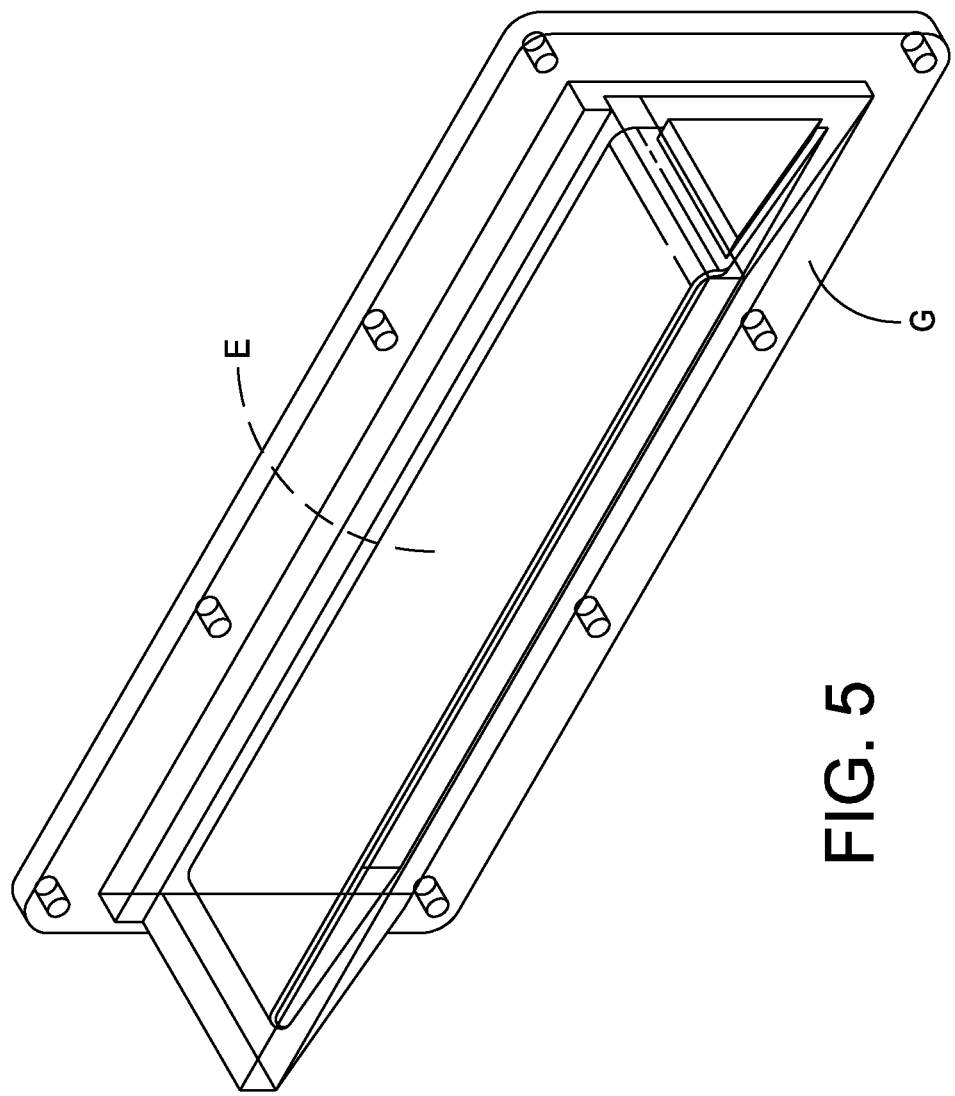
FIG. 5 is a perspective view of the same elements illustrated in FIG. 4 in an assembled position.
Figure 6:
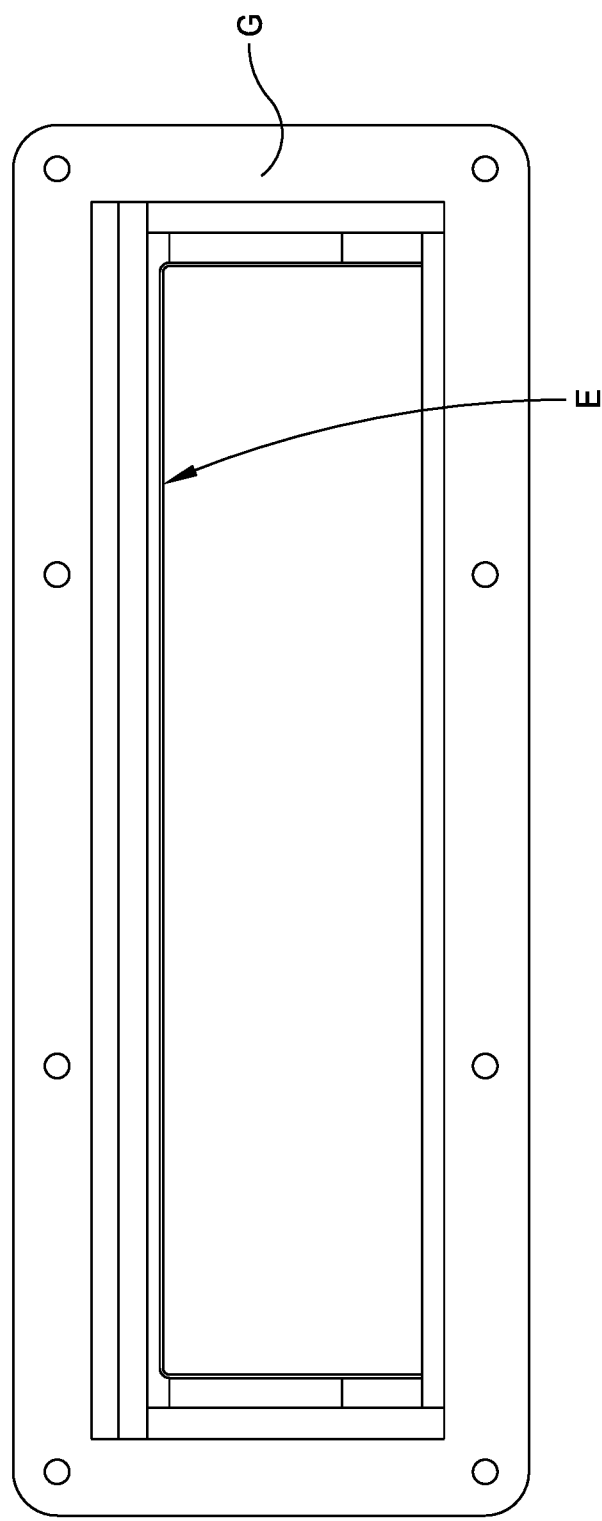
FIG. 6 is a frontal view of the elements illustrated in FIGS. 4 and 5.
Figure 7:
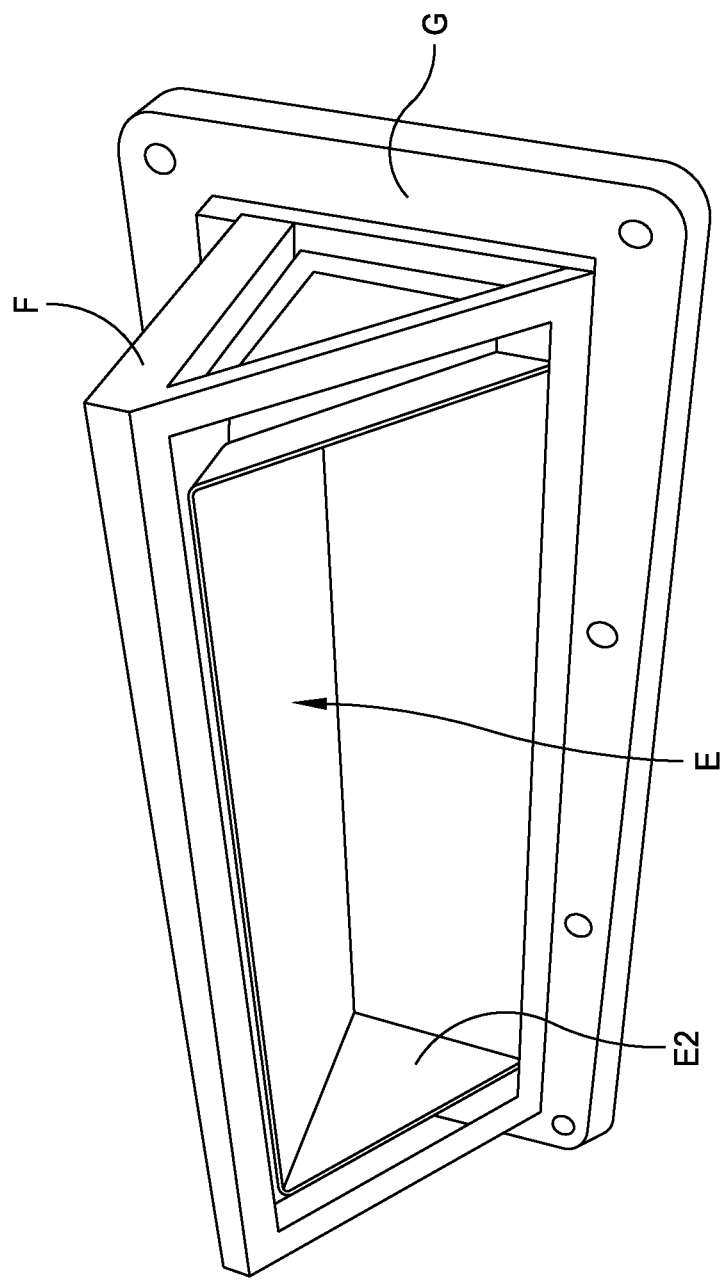
FIG. 7 is a perspective view taken from the lower position illustrating the reflector E mounted within the translucent member F.
Figure 8:
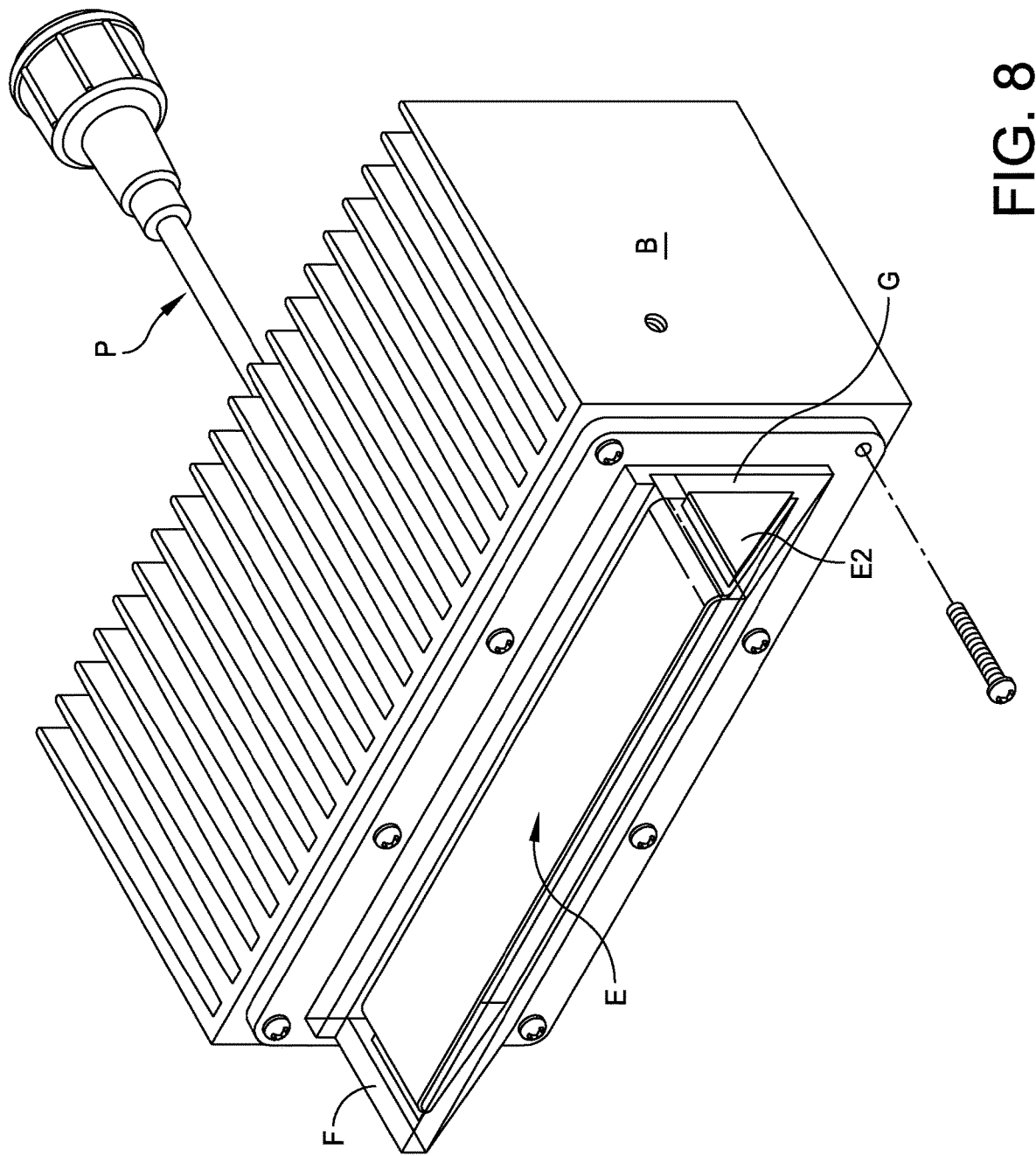
FIG. 8 is a perspective view showing the module in a completely assembled position.
Figure 9:
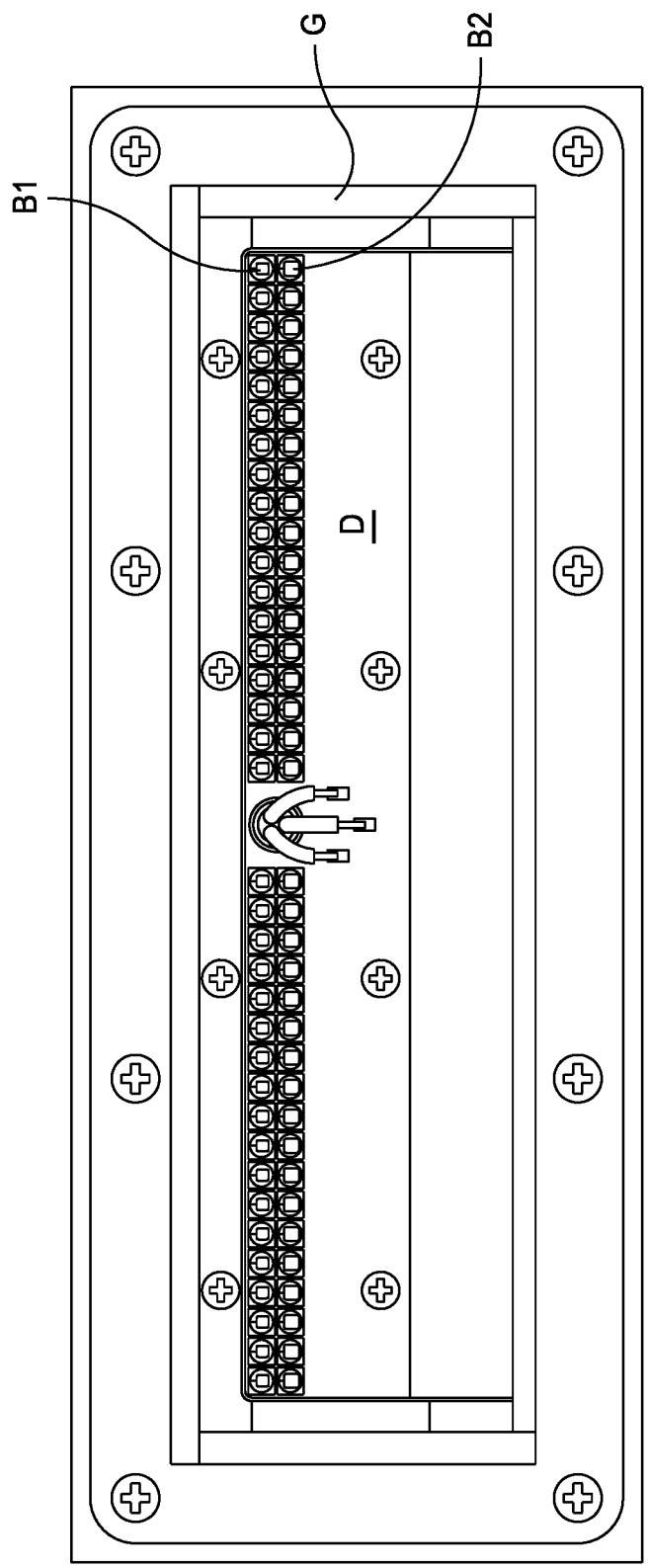
FIG. 9 is a frontal view taken at the printed circuit board to illustrate the sets of LEDs at B1 and B2.
Figure 10:
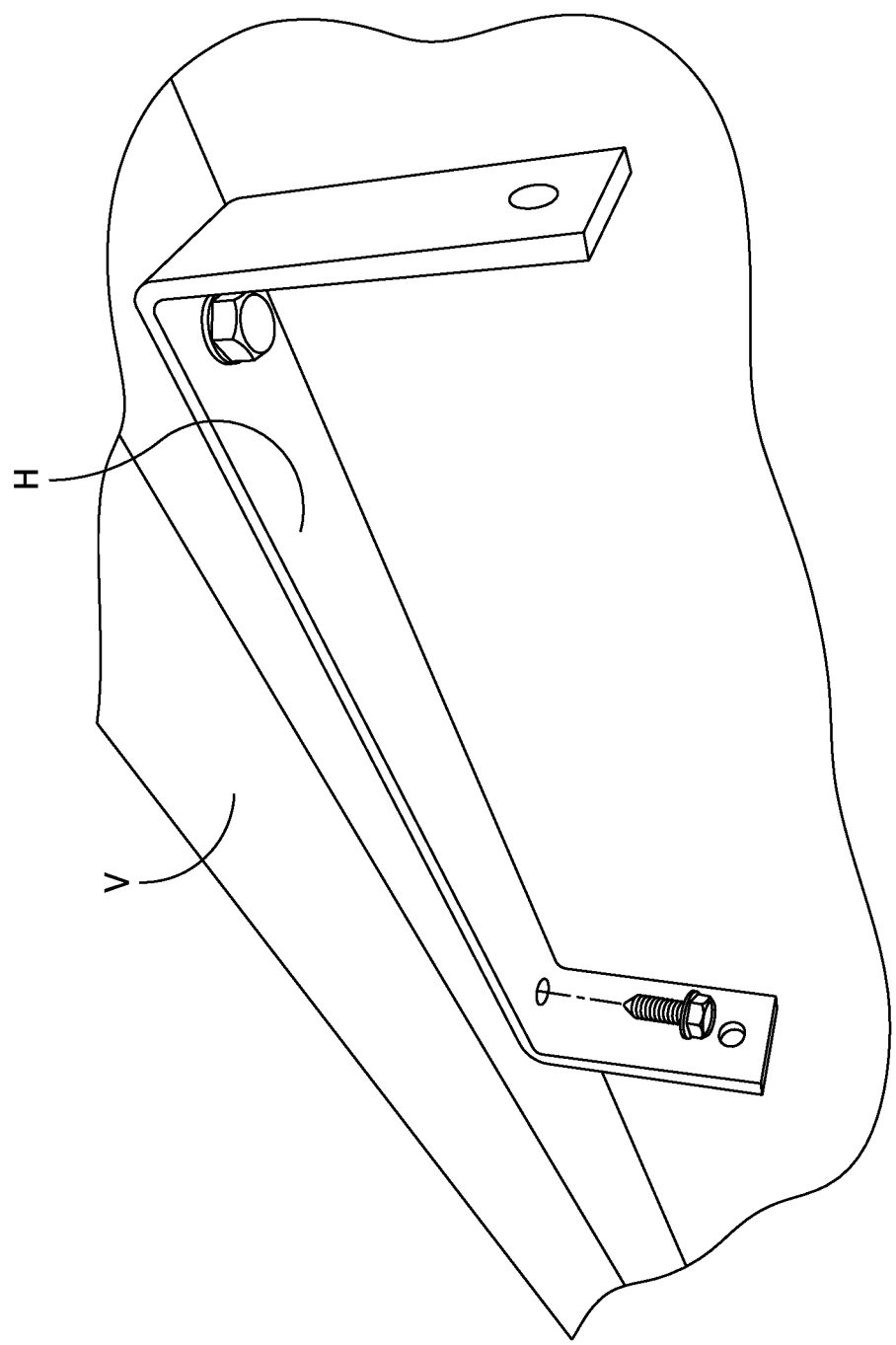
FIG. 10 illustrates a bracket H used in supporting the module from the vessel.
Figure 11:
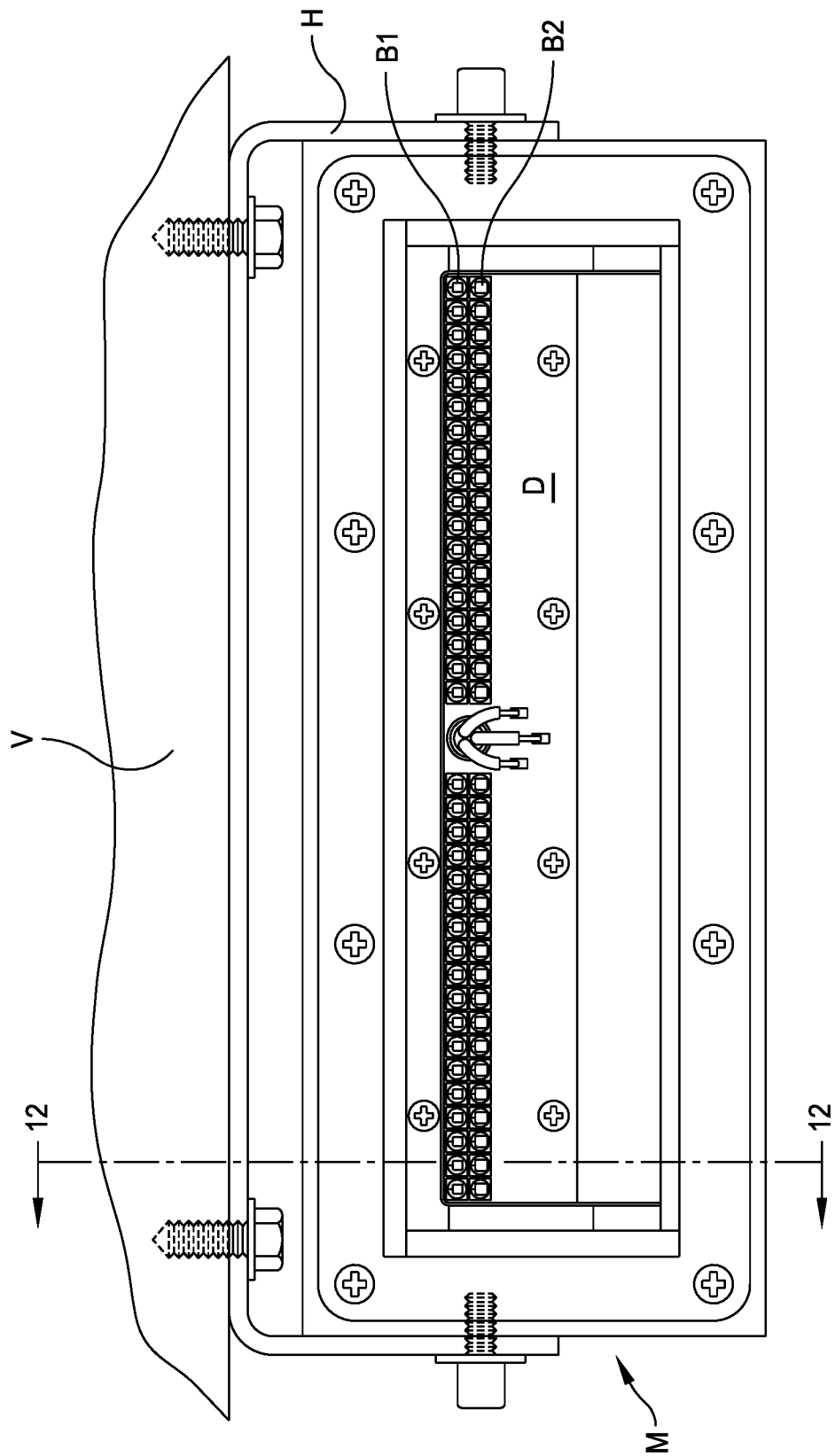
FIG. 11 is a frontal view showing the module with the exposed printed circuit board and reflector surface, as well as the bracket H for mounting the module from the vessel.

As part of this description refer to FIGS. 1-22 that provide further specific details of the system of the present invention.

In this regard, FIGS. 1-17 describe the system A which includes a heat sink B, a gasket C, a printed circuit board D for supporting the LEDs, a reflector E and a main translucent plastic piece F. FIGS. 12-17 describe the overall system. FIGS. 18-22 relate to the joystick controller.

There are several important aspects to the present invention which include the fact that a reflector is employed so that the light rays are directed toward the water and not dispersed in multiple directions. Another feature of the present invention is the use of separate LED banks or sets. This includes one bank or set B1 comprised of white LEDs and a parallel second bank or set B2 that is comprised of amber LEDs. In this regard, refer to FIGS. 3 and 9 of the drawing. The banks B1 and B2 can be organized with the bank B1 either on the top or on the bottom relative to bank B2. A switch is also employed to provide the ability to switch between the LED sets.

Figure 13:
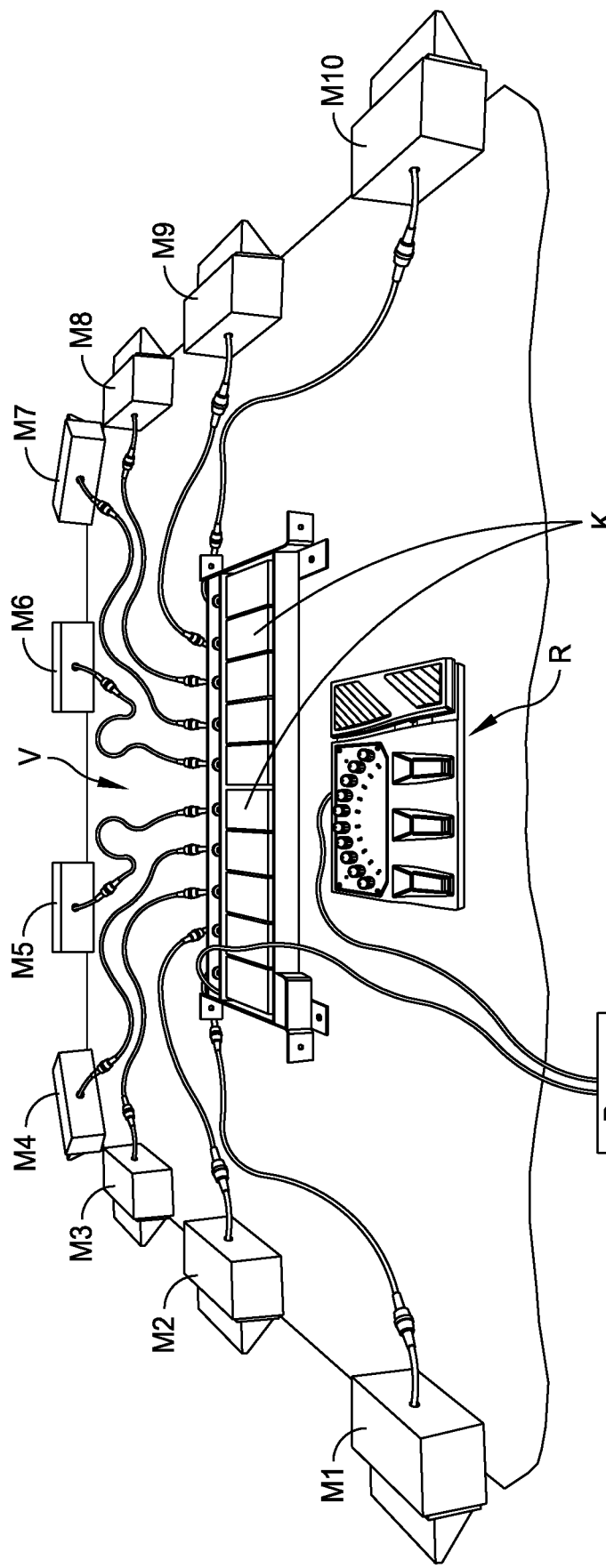
FIG. 13 illustrates the series of modules identified as modules M1 through M10 that are disposed about the front of the vessel. These modules are also at least partially illustrated in FIG. 17.
Figure 14:
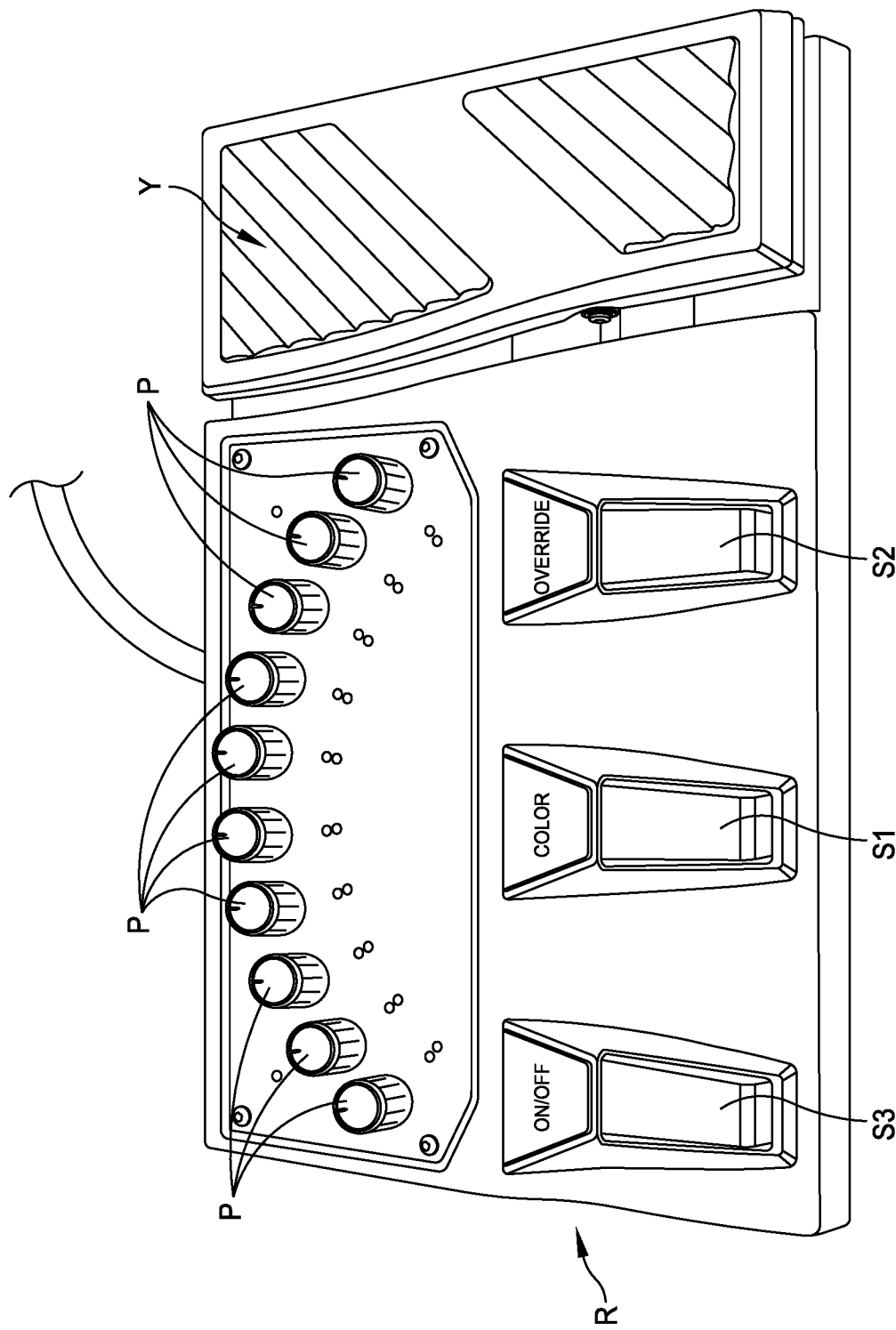
FIG. 14 illustrates the control board R of FIG. 13 in further detail.

In connection with the following detailed description, reference will be made to the controls that are described in FIGS. 13-16. With particular reference to FIGS. 13 and 14, the controller may be provided with either a hand or a foot style operation and can also be either wired or wireless. In FIG. 14, there are described three double pole double throw switches S1, S2 and S3 and one user preset potentiometer P per light. There is also described a master potentiometer to control a dimming function. The foot pedal arrangement is shown at Y in FIG. 14.

Figure 12:
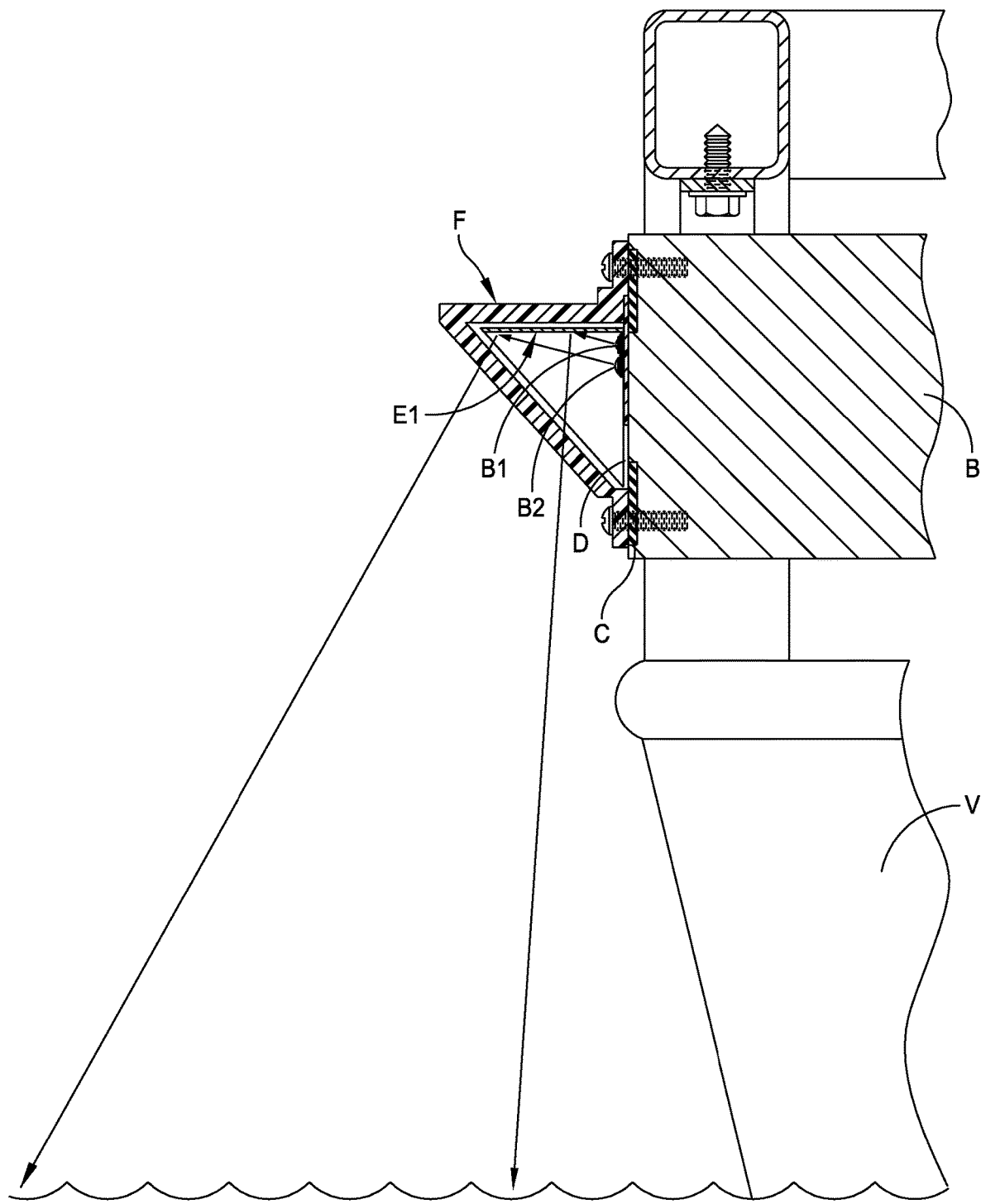
FIG. 12 is a cross-sectional view taken along line 12-12 of FIG. 11 and clearly illustrating the relationship between the sets of LEDs and the reflector surface.

The drawings, particularly in FIGS. 1-17 illustrate an ultra-compact LED light fixture that is particularly adapted for bow fishing. It uses white LEDs for clear water and amber LEDs for cloudy water. It employs a unique amber-colored LED wave band of 590 nm which is not available in any existing fixture. A custom PCB or printed circuit board D arranges the amber and white LEDs into two high density series linear arrays B1 and B2 in a horizontal double row configuration (see FIGS. 9, 11 and 12) which allows power connections to be made through a hole in its center. A reflector E with side fills is installed 0.25 mm above the horizontal to the LED arrays and protrudes outward perpendicular to the arrays toward the field of view. Thus the reflective surface E1, as shown in FIG. 12, is substantially perpendicular to the planar circuit board D. Thus, the array of LED's include a plurality of LED's, labeled in the drawings by the reference number LED, that are arranged in a spaced apart linear array, and the reflective surface E1 is substantially planar; including a planar circuit board to which the spaced apart linear array is secured, the planar reflective surface having an orthogonal relationship to the planar circuit board. The array of LED's is comprised of a pair of spaced apart LED sets, wherein the sets of LED's are disposed in parallel with each other; one LED set B1 is comprised of white wavelength LED's and the other LED set B2 is comprised of amber wavelength LED's. A switch can be used to control these LED sets and that enables illumination of either or both of the sets of LED's.

This reflector greatly increases the amount of light delivered by the LEDs by redirecting all the light that would normally be lost skyward downward, instead into or at the water in a 90×110 degree area while at the same time greatly reducing light pollution above the water line. The fixture is deck mountable (above or under) and is ip67 waterproof with a silicone gasket C between the passive aluminum heat sink and the clear acrylic cover F. The power supply Q (see FIG. 13) may also use a gasketed waterproof connection. For the mounting refer to FIGS. 10 and 11.

The reflector arrangement of the present invention is particularly advantageous using an aluminum based material with a silver coating that provides a high performance reflective surface that is 95% efficient. It is mounted horizontal in a fixture just 0.25 mm above the LED arrays it is just 1.5" deep and is very low profile. The close proximity of the reflector to the LED's redirects unusable light that is lost upward and above the waterline down and into the field of usable light on the water. Again, refer to FIG. 12 which clearly shows the proximity of the reflector surface E1 to the LED sets B1/B2. The side fills E2 offer similar enhancement to light otherwise lost out to the sides. Additional benefit from this reflector system is reduced light pollution entering private property above the shoreline.

Regarding the LED sets, LEDs Cree XP-E2 phosphor converted amber or Luxeon Rebel phosphor converted amber brand (FIG. 21) are for a murky or cloudy water. These amber colored LEDs have a light wave band that peaks at around the 590 nm wavelength. They are created with a chemical process (Iridium Gallium Nitride) and produce a broad spectrum from about 550 nm to about 670 nm with a dominate wavelength of around 590 nm. These specific LEDs are not available in any other cluster or COB (Chip on Board) configuration so a custom PCB was created to employ them into the light fixture of the present invention. No other fixture on the market uses these types of LEDs. There are however numerous fixtures available that employ LED COB s or clusters readily available that produce white light from around 2200 k warm white light to 6500 k cool white light (FIG. 22) These LED's are created using other various chemical conversion methods that convert the same blue 450 nm light into the specific desired kelvin white light. The warmer white (lower kelvin) light is preferred over cooler (higher kelvin) white light because it is helpful to penetrate murky or cloudy waters however these common white LEDs allow a significant amount of blue light to remain because not all of that light is fully converted. This light produces unwanted reflections on and in the water. The Luxeon rebel phosphor converted amber and Cree phosphor converted amber LEDs convert 100% of the blue light into amber with no spike in the 450 nm spectrum. Our testing and research shows that this phosphor converted amber light focused primarily on the 590 nm wave band with no 450 nm blue all but eliminates surface reflections, bottom distortions, and allows the viewer to make out structure on the bottom or deep in the water column even when large amounts of particles are suspended in it (murky water). It's like removing the surface and seeing distortion free high def 3-D into the water. The fish are more visible and more accurately targeted because the fish themselves are about the same exact amber color and appear to light up or glow amber when struck with it. No fixture using this LED technology is available. The performance of the light fixture of the present invention is superior to all other light fixtures on the market that attempt to accomplish the same task.

In testing this light fixture of the present invention on the water, it appears that certain fish cannot see this 595 nm wave band of light. They are often completely undisturbed by it and even swim right up to the boat allowing for more closer or non-moving shots. We believe the light is performing like the way infrared does to humans and is either totally or partly invisible to fish the way red light (650 nm) is to many animals, but yet human eyes are still sensitive to it. It appears they either can't see it at all or can only see some of the light produced by the phosphor converted amber. We believe that it's the yellows, greens and mainly the blue light that can cause the fish to spook, and because these phosphor converted amber LEDs have none, it seems like it is almost invisible to the fish making the observation thereof much easier.

Regarding the printed circuit board D it may have a copper core double row horizontal configuration. The PCB D accepts 36 amber and 36 white LED's listed above or any other combination of colored or white LED's from the Cree XP-E2 or Luxeon Rebel line up. It was helpful to create a custom PCB D for these LED's because no clusters are cobs of our specific layout existed. The PCB provides two horizontal LED series arrays B1/B2 that helps distribute heat across the entire heat sink B. The PCB provides circuitry from the constant current LED driver K to the two LED arrays. The two series arrays share a common negative lead and each array has its own positive lead. There are 3 solder pads that are located near the center hole for the 3 conductor 18 gauge power supply wire P. (see FIGS. 1 and 8))

Figure 15:
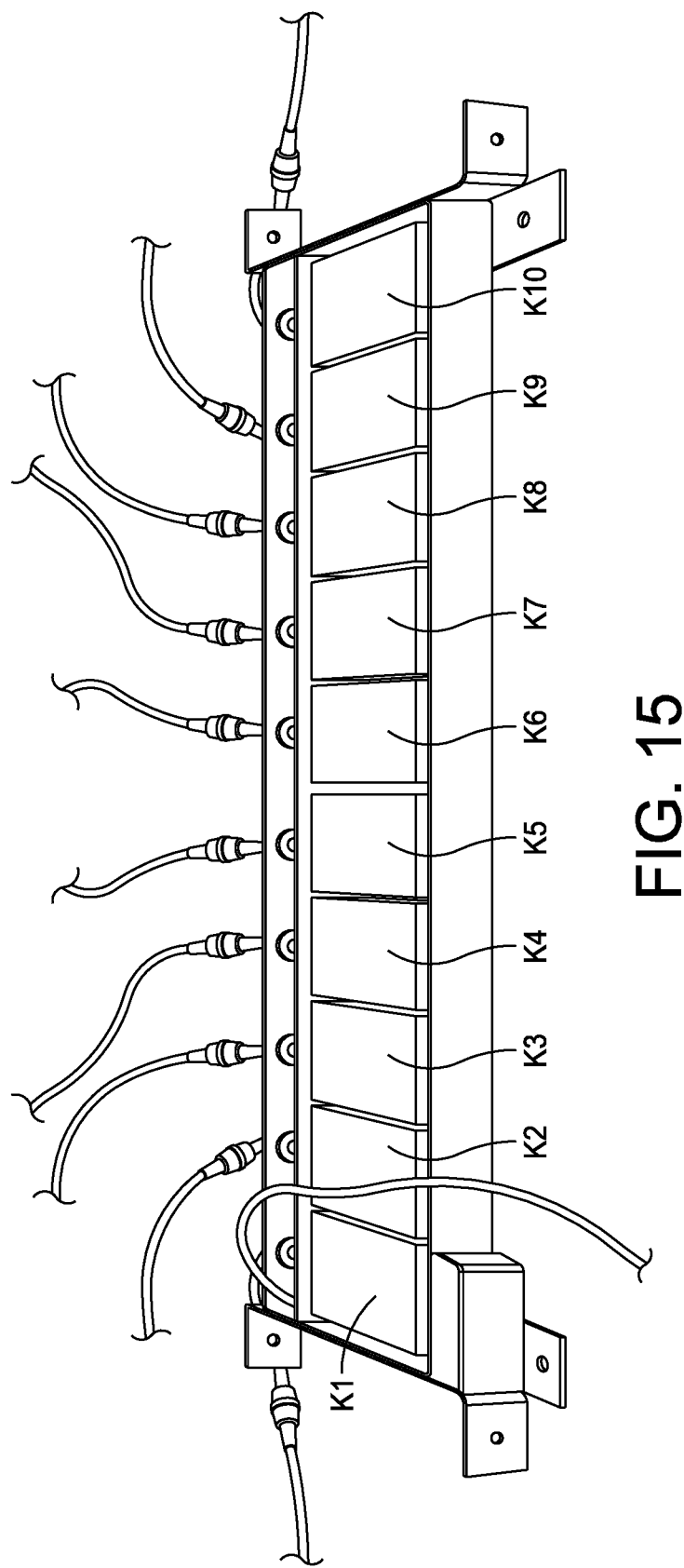
FIG. 15 illustrates the respective drivers K1 through K10 and associated wiring.
Figure 16:
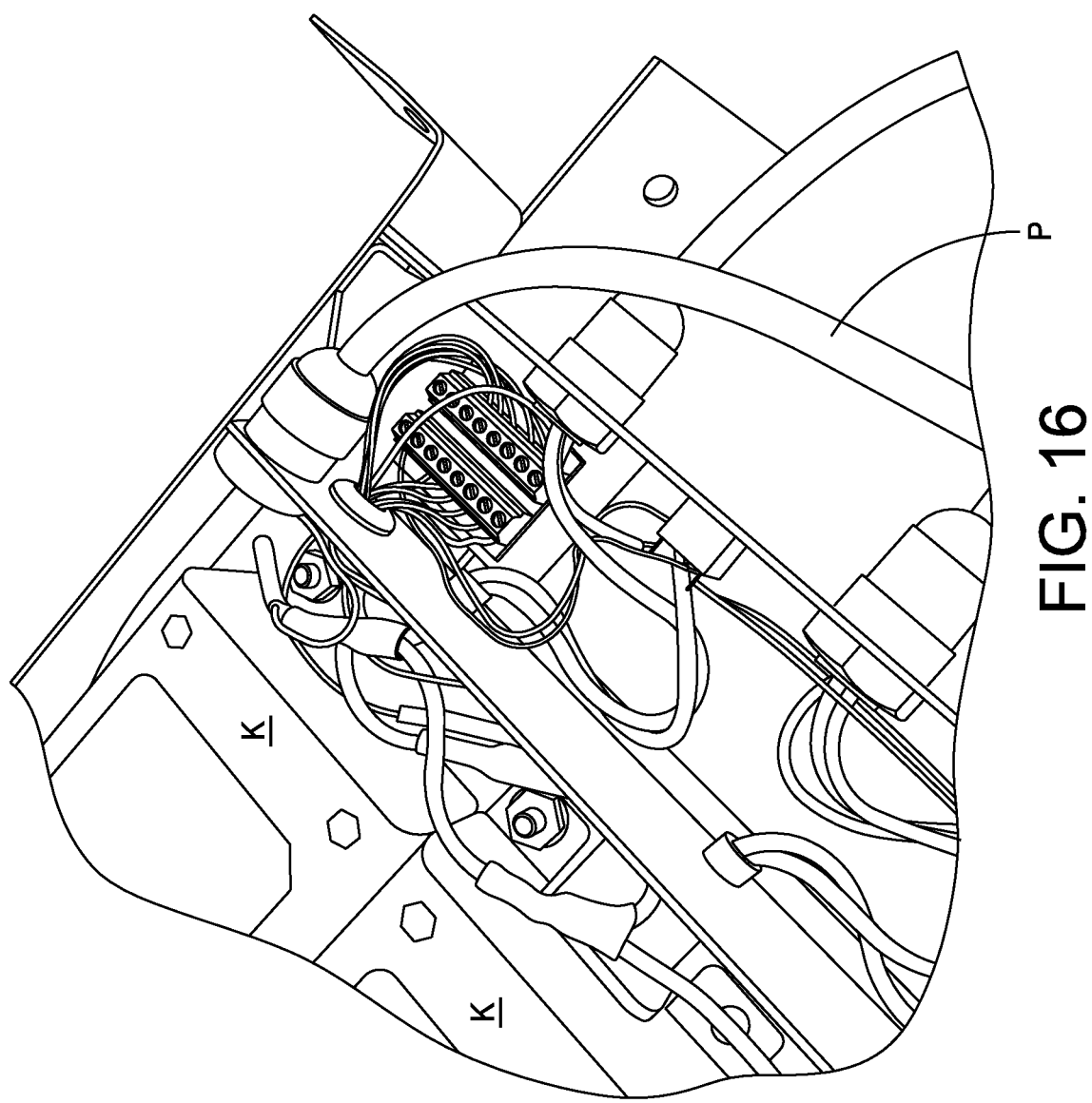
FIG. 16 illustrates the power cord connecting to the drivers K.
Figure 17:
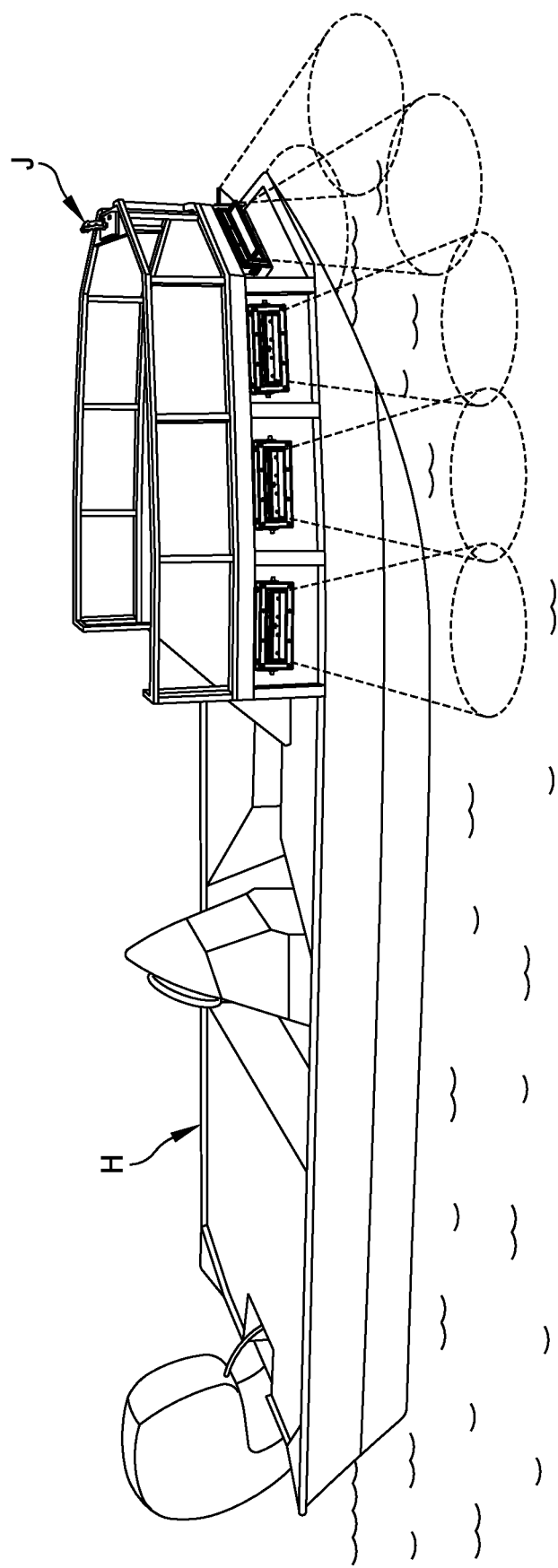
FIG. 17 illustrates the illumination array as disposed about the front of the vessel V.

Refer also now to FIGS. 13-15 for a description of the overall wiring from the power supply Q, via the drivers K (10 drivers shown as drivers K1 through K10 in FIG. 15). This shows the LED driver module assembly/controller. The assembly housing contains at least one Meanwell EGL-75-C700B constant current 700 ma LED driver which is used to drive one light fixture. The power input side of the driver is supplied with a 100 to 240 volt 50/60 cycle alternating current source via a standard 3 prong plug from a wall outlet which can by supplied by an outlet, generator, or power inverter. On the output side of the driver, there are 2 outputs, one for the dimmer control and the other for supplying power to the fixture. The dimming feature is controlled by a potentiometer P (see FIG. 14) in the controller by sweeping voltage from 0 v-12 v from an additional 12 v DC power supply (also housed within the driver module assembly) This is an AC to DC converter that is also powered by the same alternating current source that the driver uses.

Each LED driver (K) has a maximum output voltage that matches the maximum forward voltage of both LED arrays on the PCB (D). This is important in allowing for a switch to control a single pole double throw relay that directs the positive output of each driver between the arrays seamlessly without turning off the driver and without risk of damaging them due to voltage spikes. The negative output of each driver is routed directly to the common negative on the PCB. The relay uses the same 12 VDC power supply the dimmer uses which is controlled via a switch in the controller. Each press of the switch either energizes or de-energizes the coil in the relay and acts as an "either or switch". When the coil is supplied with 12 v, the coil is energized, one of the two arrays (LED sets) is supplied with the sets are identified herein as B1 and B2. The led power output after the relay is fed out of the driver module assembly housing via the same kind of waterproof pigtail that the fixture uses. There is a length of 18 awg wire that has male plugs on each end that plug each light in the system to an output of the driver module assembly. All of the conductors that go from the driver module assembly (K) to the controller are routed by a single multi-conductor wire and matching breakout boxes that are installed in both the driver module assembly and the controller. The conductor count required depends on the fixture count in that particular system.

The driver module assembly (K1 through K10) is mounted below deck or in any other desirable place onboard. The controller can be either a wired or wireless hand or foot style controller. It has 3 double pole double throw switches and one user preset potentiometer P (see FIG. 14) per light and a master potentiometer to control the dimming function and several colored 5 mm LEDs that are also powered by the same 12 VDC power supply used to indicate the condition of various modes or settings on the controller. There is one dimmer per light in the user preset field on the controller which can be set anywhere from 0%-100% and a 5 mm colored LED to show the brightness and whether that particular light is completely off or on just by looking at it. The 5 mm LED will also dim from 0%-100% along with the actual fixture(s) when it is off, that means the fixture is also off.

The master dimmer controls the output of all drivers K simultaneously by dimming from 0% to the maximum user preset percentage set by the user in the user preset field on the controller when it is NOT in the user preset override mode. When in user preset override mode, the master dimmer is free to dim all the lights from 0%-100% regardless of the user presets even if they are turned completely off. The foot controller option uses a rocking foot pedal that allows the user to control the master dimmer by rocking the pedal forward or backward instead of turning a knob by hand. Refer to FIG. 14 and the foot pedal Y. Switch S1 when pressed switches all the relays in the driver module assembly (one per fixture) from one color to the other. The switch also switches a 5 mm LED in the controller that matches the color of the array chosen (amber for amber and white for white).

In FIG. 14 the switch S2, when pressed, switches between user preset and user preset override which overrides the user preset dimmers turning on all lights in the system at once regardless of what the user presets were, forwarding unanimous dimming control to the master dimmer. Also when in the user preset override mode, there is a 5 mm blinking red led to show that that particular mode is active. When it is inactive, this blinking led turns off or turns green. In FIG. 14, switch S3, when pressed, turns all the lights in the system on or off. There is a 5 mm red led to indicate when the system is off. The foot controller option uses the same switches in a stomp switch configuration that allows the use to control all three switches by stepping on them instead of pressing them by hand.

Reference is now made to the drawings that relate to a joystick control of several functions associated with a boat or other water vessel. Although the descriptions herein pertain primarily to a vessel used for bow fishing, it is understood that the joystick control of the present invention can be applied to other types of vessels such as a trolling boat.

Figure 19:
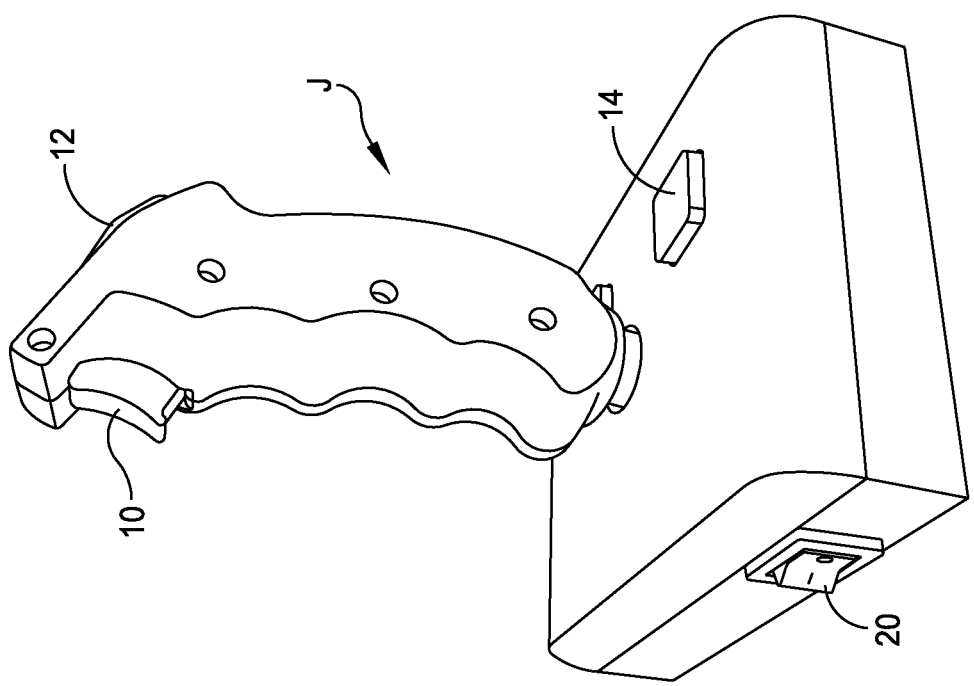
FIG. 19 is a further perspective view of the joystick controller of FIG. 18 showing the various buttons 10, 12, 13 and 14 along with the on/off switch 20.
Figure 18:
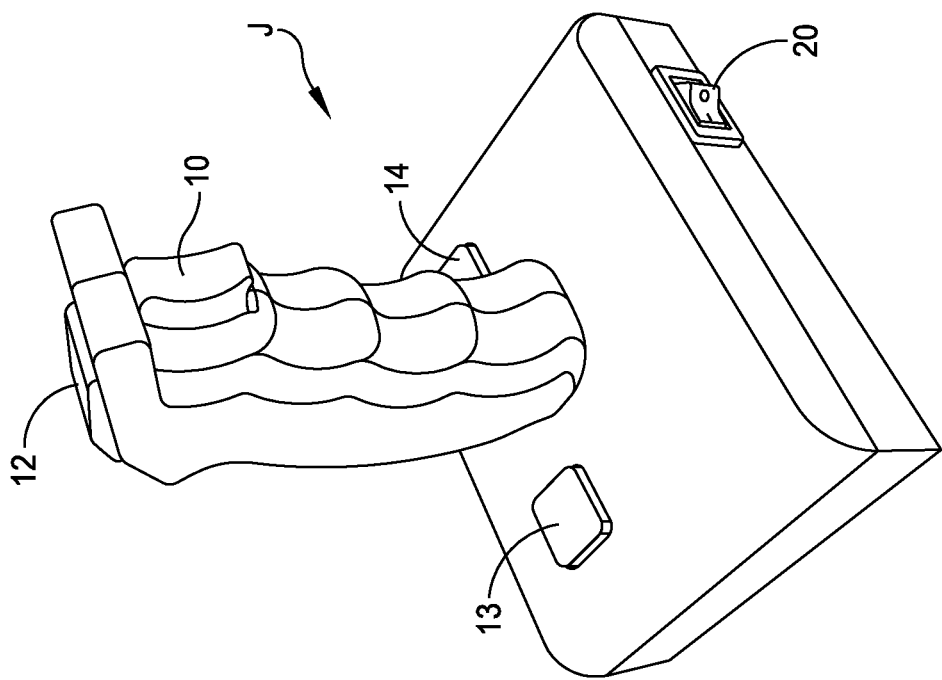
FIG. 18 is a perspective view of the joystick controller of the present invention as taken from the front thereof.
Figure 20:
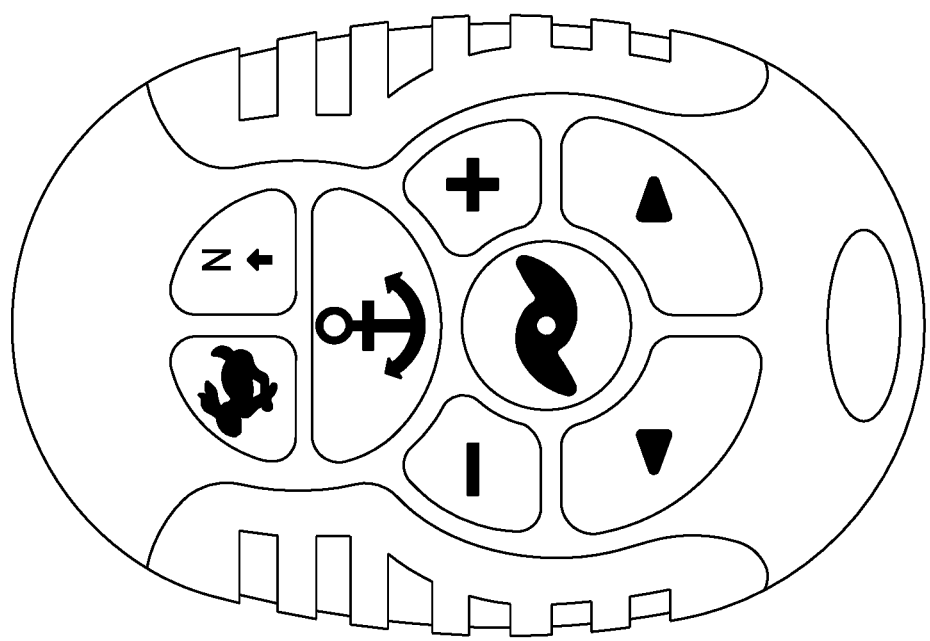
FIG. 20 illustrates a fundamental fob.
Figure 21:
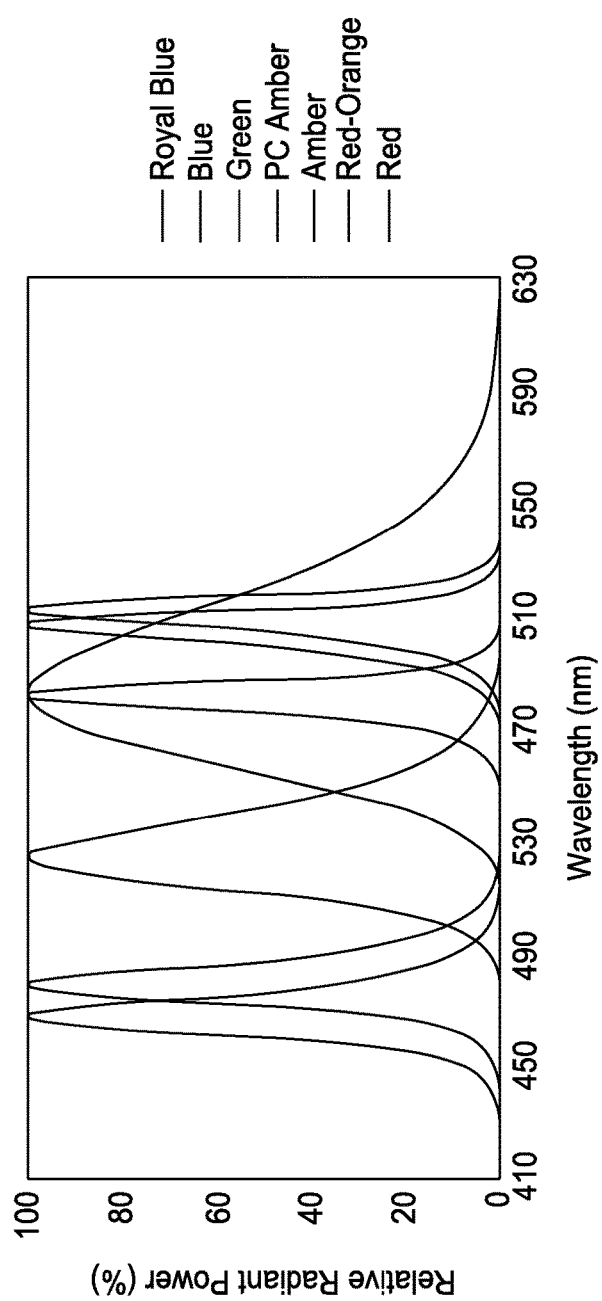
FIG. 21 is a graph of wavelength regarding the amber LEDs.
Figure 22:
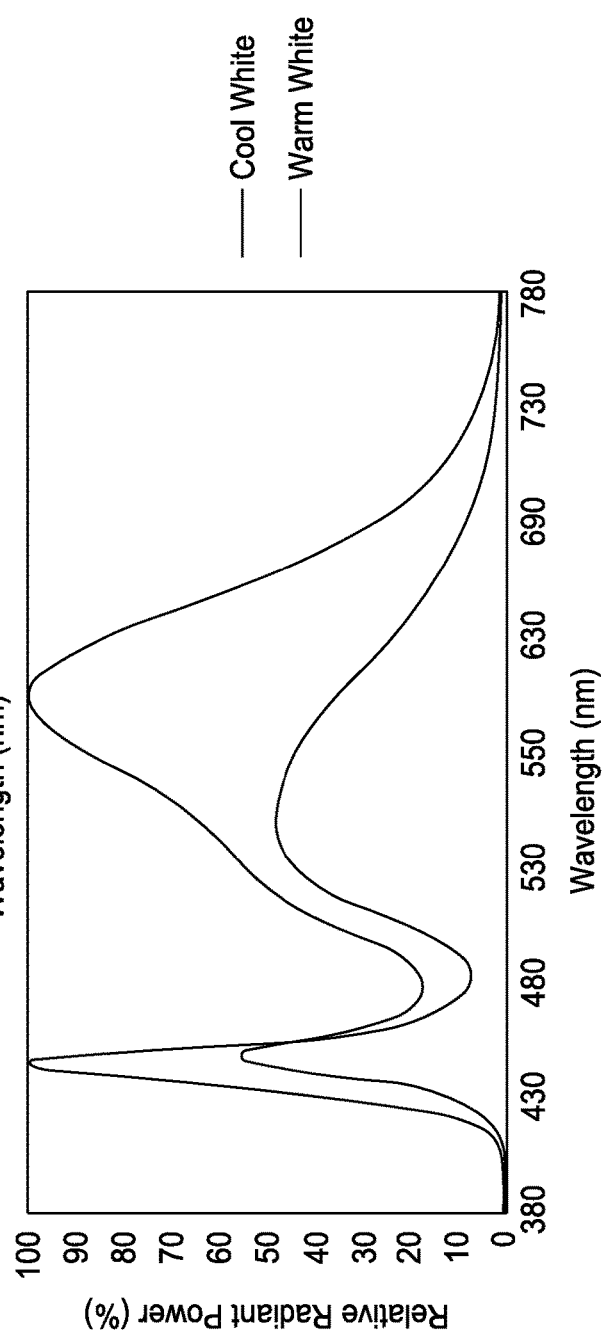
FIG. 22 is a graph of wavelength for the white LEDs.

The joystick controller of the present invention is shown primarily in FIGS. 18 and 19 with a known FOB version shown in FIG. 20. The joystick controller is a wireless controller, particularly useable for trolling motors; in a joystick configuration that is designed mainly with the bowfisher in mind. It provides the user with superior boat control and gives the user a way to immediately regain control after taking a shot at a fish or taking his/her hand off of it for any reason. This is a great advantage over conventional controllers. There are clear advantages of the wireless joystick controller of the present invention over conventional wireless controllers. Conventional wireless controller fobs (see FIG. 20) are designed to resemble and function much like a key fob for a car that is worn like a necklace or on a lanyard on a belt buckle attached to the user. When using a fob for bow fishing, it is very difficult to take a shot (both hands required) and then try to quickly regain control of the boat after letting go of it because it's hard to quickly get the fob correctly oriented in your hand and the buttons on the fobs are laid out in tight clusters that look and feel the same. To find the correct buttons and press them quickly enough to regain boat control in the required time is difficult and doing this in the dark at night (when the bow fishing sport most often takes place) makes this task even harder. However, having the same type of controllability in a mounted joystick style configuration solves these problems. It dramatically cuts down on the average response time required to regain boat control which is vital for the sport of bow fishing and because the wireless joystick is designed to be mounted to the boat via magnets or suction cups on a pedestal, instead of the user; it also allows a partner to easily take over control if the previous user walks away from it to reel in a fish or for any other reason. It is also very self-explanatory, user friendly and easy to learn to use compared to the fobs.

The joystick controller of the present invention is made of ABS plastic, with 2 springs, 8 momentary SPDT buttons, one power switch and a wireless controller board. The device is powered by 2 AA batteries that make the 3 volts needed to power the wireless control board. All of the buttons and switch are ip67 waterproof and will continue to work after being submerged. All of the buttons, batteries, and power switch, are soldered to a specific locations on the wireless control board by thin wires which complete the circuit.

The joystick controller shown in FIGS. 18 and 19 uses a standard existing controller layout with all its functions and repositions the buttons in a different configuration with buttons laid out in such a way that allows them to be easily accessed. There are 8 functions and buttons total on the joystick controller of the present invention that produce the same functions as with a standard FOB per FIG. 20. The button mapping is as follows:

Button 10—The front trigger button on the handle turns the propeller on/off.
Button 12—The top thumb button on the handle turns high speed mode on/off.
Button 13—The right button on the base turns the spot lock feature on/off.
Button 14—The left button on the base turns auto pilot on/off.
Tiling the handle left makes the motor (boat) turn left.
Tilting the handle right makes the motor (boat) turn right.
Tilting the handle forward increases the speed of the propeller (boat).
Tilting the handle backward decreases the speed of the propeller (boat).

The joystick controller that is shown is adapted for use with any bluetooth or legacy (Minn Kota ipilot or ipilot link) trolling motors which include Ulterra, Terrova, or ipilot equipped Power Driver trolling motors. The wireless joystick syncs up to these motors using the same method as the fob version does. Different variations of it can be produced in a similar way for other models and brands like the Minn Kota Co pilot system and wireless Motor Guide trolling motors or any other trolling motors that have wireless controllers with any number of buttons on it.

In accordance with additional features of the present invention:

Each fixture uses an LED driver that has a maximum output voltage that perfectly matches the maximum forward voltage of both LED arrays which is critical in allowing a relay to direct power between either of the arrays seamlessly without turning off the fixture and without risk of damaging the arrays due to overvolting.

The amber LED array is comprised of special phosphor converted amber LEDs using an indium gallium nitride conversion chemistry which produces more lumens per watt than standard conventional amber LEDs that use other chemical conversions processes.

The phosphor converted amber LEDs improve visibility in murky or cloudy water, help reduce surface glare, minimize reflections and give the bowfisher better visibility overall in low visibility water conditions.

The bowfishing illumination system includes a single dimmer feature that is used to increase or decrease the light intensity from 0% to 100% of all the fixtures in the system simultaneously.

The bowfishing illumination system is fully modular and expandable to any number of fixtures.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A bow fishing illumination system for support on a vessel and comprised of a bank of illumination modules that extend outboard of the vessel so as to illuminate a water surface about the vessel, said bank of illumination modules including a support housing, a reflective member disposed with the support housing and having a reflective surface, and an array of LED's disposed with the support housing in a manner to have their light beam extend away from the support housing, said reflective member being supported at the supports housing so that the reflective surface is substantially horizontal so as to direct the light beam from the LED array toward the water surface;
    wherein the array of LED's include a plurality of LED's that are arranged in a spaced apart linear array, and the reflective surface is substantially planar;
    wherein the array of LEDs is comprised of a pair of spaced apart LED sets, wherein the sets of LED's are disposed in parallel with each other; and
    wherein one LED set is comprised of white color LED's and the other LED set is comprised of phosphor converted amber color LED's.

2. The bow fishing illumination system of claim 1 wherein each of the illumination modules is spaced apart from an adjacent illumination module.

3. The bow fishing illumination system of claim 2 wherein the bank of illumination modules includes at least one illumination module directed forward at a front of the boat and at least one illumination module on respective fore and aft sides of the boat.

4. The bow fishing illumination system of claim 1 including a planar circuit board to which the spaced apart linear array is secured, the planar reflective surface having an orthogonal relationship to the planar circuit board.

5. The bow fishing illumination system of claim 1 including a switch that controls a relay that enables illumination of either or both of the sets of the LED arrays.

6. A bow fishing illumination system for support on a vessel and comprised of a bank of illumination modules that extend outboard of the vessel so as to illuminate a water surface about the vessel, said bank of illumination modules including a A support housing, a reflective member disposed with the support housing, and an array of LEDs disposed with the support housing in a manner to have their light beam extend away from the support housing and reflected downward toward the water surface by the reflective member, the array of LEDs including a plurality of LEDs that are arranged in at least one spaced apart linear array; a heat sink mounted to the vessel; said support housing including a support plate that is mounted to the heat sink; a translucent piece that is mounted to a face of the heat sink; said translucent piece including a slanted part and a top horizontal cover part; the reflective member having a surface that is substantially planar and that is secured within the translucent piece under the horizontal cover part; a circuit board that is disposed within the translucent piece and that is mounted substantially vertically; said circuit board for mounting the array of LEDs.

7. The bow fishing illumination system of claim 6 wherein the bank of illumination modules includes at least one illumination module directed forward at a front of the boat and at least one illumination module on respective fore and aft sides of the boat.

8. The bow fishing illumination system of claim 6 wherein the array of LED's is comprised of a pair of spaced apart LED sets, wherein the sets of LED's are disposed in parallel with each other, and each mounted on the circuit board.

9. The bow fishing illumination system of claim 6 wherein the reflective member includes a planar reflective surface that is disposed horizontally and opposite disposed side pieces that are each disposed perpendicular to the array of LEDs.

10. The bow fishing illumination system of claim 9 wherein the opposite disposed side pieces are also disposed perpendicular to the planar reflective surface.

11. The bow fishing illumination system of claim 6 wherein the array of LED's is comprised of a pair of spaced apart LED sets, wherein the sets of LED's are disposed in parallel with each other.

12. A bow fishing illumination system for support on a vessel and comprised of a bank of illumination modules that extend outboard of the vessel so as to illuminate a water surface about the vessel, said bank of illumination modules including a support housing, a reflective member disposed with the support housing and having a reflective surface, and an array of LED's disposed with the support housing in a manner to have their light beam extend away from the support housing, the array of LED's including a plurality of LED's that are arranged in at least one spaced apart linear array;
    wherein the reflective surface is substantially planar;
    wherein the reflective member is supported at the support housing so that the reflective surface is substantially horizontal so as to direct the light beam from the LED array against the reflective surface and downward toward the water surface;
    wherein the array of LED's is comprised of a pair of spaced apart LED sets, wherein the sets of LED's are disposed in parallel with each other; and
    wherein one LED set is comprised of white wavelength LED's and the other LED set is comprised of amber wavelength LED's.

13. The bow fishing illumination system of claim 12 including a planar circuit board to which the spaced apart linear array is secured, the planar reflective surface having an orthogonal relationship to the planar circuit board.

14. The bow fishing illumination system of claim 12 including a switch that enables illumination of either or both of the sets of LED's.

15. The bow fishing illuminations system of claim 12 including one or more of the following features:
    an LED driver that has a maximum output voltage that matches a maximum forward voltage of both LED arrays;

the amber LED array is comprised of special phosphor converted amber LEDs using an indium gallium nitride conversion chemistry;

the phosphor converted amber LEDs improve visibility in murky or cloudy water, help reduce surface glare, minimize reflections and give the bowfisher better visibility overall in low visibility water conditions;

the bowfishing illumination system includes a single dimmer feature that is used to increase or decrease the light intensity from 0% to 100%;

the bowfishing illumination system is fully modular and expandable.

* * * * *